United States Patent [19]

Chu et al.

[11] Patent Number: 4,577,317
[45] Date of Patent: Mar. 18, 1986

[54] METHOD FOR EXTENDING A PARALLEL DATA BUS

[75] Inventors: Paul C. Chu, San Jose; Gerald K. Mercola, Pleasanton, both of Calif.

[73] Assignee: ICS Electronics Corporation, San Jose, Calif.

[21] Appl. No.: 485,162

[22] Filed: Apr. 15, 1983

[51] Int. Cl.[4] .............................. H04J 3/12; H04J 3/02
[52] U.S. Cl. ................................... 370/110.1; 370/85; 370/89; 370/94
[58] Field of Search ............... 370/110.1, 85, 90, 94, 370/89; 340/825.52

[56] References Cited

U.S. PATENT DOCUMENTS

| | | | |
|---|---|---|---|
| 3,922,486 | 11/1975 | Dejean | 370/110.1 |
| 4,271,506 | 6/1981 | Broc et al. | 370/13 |
| 4,271,510 | 6/1981 | Looschen | 370/110.1 |
| 4,342,986 | 7/1982 | Buskirk et al. | 340/825.52 |
| 4,390,969 | 6/1983 | Hayes | 340/825.52 |
| 4,424,514 | 1/1984 | Fennell et al. | 340/825.52 |
| 4,430,651 | 2/1984 | Bryant et al. | 370/94 |
| 4,451,886 | 5/1984 | Guest et al. | 364/200 |

OTHER PUBLICATIONS

"Serial Extension of the IEEE-488 Interface Bus," Electronic Product Design, Jul. 1982, pp. 41–43.

"Computer Communications", Denney and Baghdadi, Aug. 4, 1979.

Primary Examiner—Douglas W. Olms
Assistant Examiner—Curtis Kuntz
Attorney, Agent, or Firm—Thomas Schneck

[57] ABSTRACT

A bus extender which accepts data from a parallel data bus and extends the bus by means of a serial link to another parallel bus. The bus extender comprises a local and remote station or terminal, each having a transmit and receive section. A transmit terminal receives a data frame from the parallel bus and decomposes the frame into data and management sub-frames. The local and remote terminals exchange management sub-frames, thereby starting the transmission process. A data sub-frame is then transmitted from the local to the remote station and a management sub-frame is returned from the remote station indicating receipt of the data sub-frame. Other sub-frames may be exchanged for specialized purposes, such as polling and error signalling. Specialized messages may be identified by tagging sub-frames with message codes. At the remote station, the original management and data bits are reassembled into a single data frame with placement of the bits in the same order as originally appeared at the local station. The new frame is then transferred on the data bus with all bits in parallel. The bus extender appears transparent to the two parallel bus sections.

6 Claims, 5 Drawing Figures

METHOD FOR EXTENDING A PARALLEL DATA BUS

DESCRIPTION

1. Technical Field

The invention relates to data communications method and protocol for extending the length of a multi-bit parallel data bus.

2. Background Art

One of the best-known parallel data bus standards is IEEE-488. This standard sets forth the organization and protocol for data transfer between components of a data system, such as an instrumentation system, where data is gathered and recorded or processed. The IEEE-488 bus uses 16 signal lines of which 8 lines are reserved for data, and 8 other lines are used for other messages, both the data and the other messages being transferred in a parallel manner.

One of the problems encountered with parallel buses is that their length is limited by transmission characteristics of the individual wires. Over short distances these characteristics, such as cross-talk and bandwidth limitations are insignificant. However, over distances of tens of meters and greater these are magnified such that errors in transferred bits become apparent.

In the prior art, others have realized that by temporarily converting a parallel data stream to a serial stream, and then back again, a parallel bus maybe extended. For example, see the article entitled "Serial Extension of the IEEE-488 Interface Bus" in *Electronic Product Design*, Vol. 3, No. 7, July, 1982 p. 41-3.

While some serial bus extenders use modems and telephone lines, they are limited in speed to telephone line bandwidths, about 10 KHz at best. On the other hand, a normal data rate for a parallel bus is on the order of tens of kilobytes per second. A problem of prior art serial bus extenders is that the data rate is too slow.

A typical prior art approach involves taking the parallel 16-bit pattern and arranging it into a data frame of more than 16 bits for serial transmission. Typically, such a prior art frame has a start bit, the 16 parallel bits serially arranged, plus several local message bits, a number of parity bits, followed by a stop bit. Thus, a prior art frame is rather larger in size. Frequently only local message bits will change from frame to frame and so there is a significant amount of redundancy. This redundancy becomes a bottleneck which limits the rate of flow of data on a bus.

An object of the invention was to increase the efficiency of a parallel bus extender by providing a new communications protocol. Another object of the invention was to find a method of decomposing frames derived from parallel data buses in a manner for efficient serial transmission of data and then reconstructing the original frame.

DISCLOSURE OF INVENTION

The above objects have been met by a bus extender which speeds data transfer by providing a new communications protocol which features a three-bit local message. The local message reports the state of the bus extender from a local extender to a remote extender and vice-versa. With more specific local messages, a more efficient handshaking protocol is provided between local and remote stations. The new extender also decomposes parallel frames derived from a bus such as an IEEE-488 bus. The decomposed frame is split into a data sub-frame and a management sub-frame. The data sub-frame principally includes the data bits plus a name tag, identifying the sub-frame as a data sub-frame. Another sub-frame is formed from management bits and also tagged to identify the sub-frame.

Local and remote terminals are provided, with each terminal terminating a parallel bus and connected by means of a serial half duplex communications link. It is assumed herein that a local device is transferring data to a remote device. In order to transmit data over the serial link, the local and remote terminals exchange management sub-frames, thereby starting the transmission process. A data sub-frame is then transmitted from the local to the remote location and a management sub-frame is returned from the remote location indicating satisfactory receipt of the data sub-frame. This exchange of sub-frames is termed a hand shaking procedure which assures that the remote location is not sent data until it is ready to receive it and also assures receipt of the data. The hand shaking procedure using these smaller size sub-frames is done at high speed and since there is no redundancy, there is an overall improvement in communications efficiency, allowing greater data transfer speeds.

Besides the data and management sub-frames, two other sub-frames may be used. A polling sub-frame may be used while a parallel poll is executed. Another sub-frame which may be provided is an error sub-frame in the event that a serial transmission error occurs. For example, if electrical noise distorts the serial stream, an error sub-frame is transmitted causing repetition of the transmission procedure.

At both local and remote stations, parallel frames are reconstructed using the reverse procedure from their decomposition. Parity and message code bits are discarded since their function has been served. The original management and data bits are reassembled into a single data frame with placement of the bits in the same order as they originally appeared at the other terminal. The new frame is then placed on the data bus, with all bits in parallel.

One of the advantages of the serial transmission procedure of the present invention is greater transmission speed and efficiency than possible in the prior art.

BRIEF DESCRIPTION OF THE DRAWINGS

FIGS. 4a and 4b are intended to be connected together along lines a—a, b—b, c—c, d—d, and e—e.

BEST MODE FOR CARRYING OUT THE INVENTION

Figure 1:
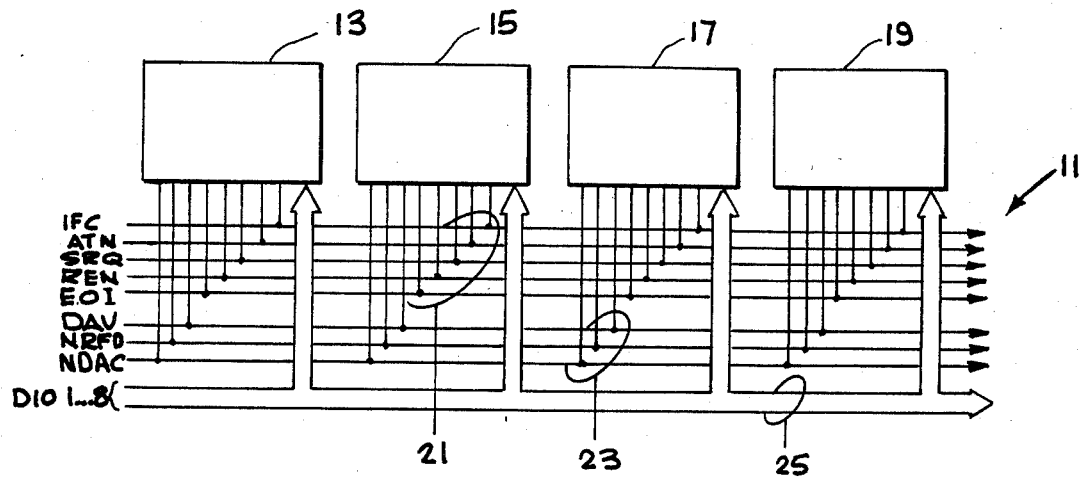
FIG. 1 illustrates a parallel data bus of the prior art.

With reference to FIG. 1, a parallel, 16-line bus 11 is illustrated. The bus illustrated in an IEEE-488 bus having various communicating devices 13, 15, 17, 19 connected thereto. Some of these devices are able to talk, listen and control the bus. Other devices may be able to only talk and listen or only able to listen or only able to talk. Usually one of the devices has the capability of system control. Sometimes more than one device has the ability of bus operation control. All of the bus controllers except one should be inactive.

Five lines of the bus, 21, are for general interface management. These lines are labeled IFC for interface clear, ATN for attention, SRQ for service request, REN for remote enable and EOI for end or identify.

Three additional lines 23 are used for data byte transfer control. These are usually labeled DAV for data available, NRFD for not ready for data and NDAC no data acknowledged.

Lines 25 are 8 parallel data lines handling parallel data bits. This configuration is the standard IEEE-488 data bus. However, the present invention is not restricted to this bus and may be applied to other parallel line buses.

Figure 2:
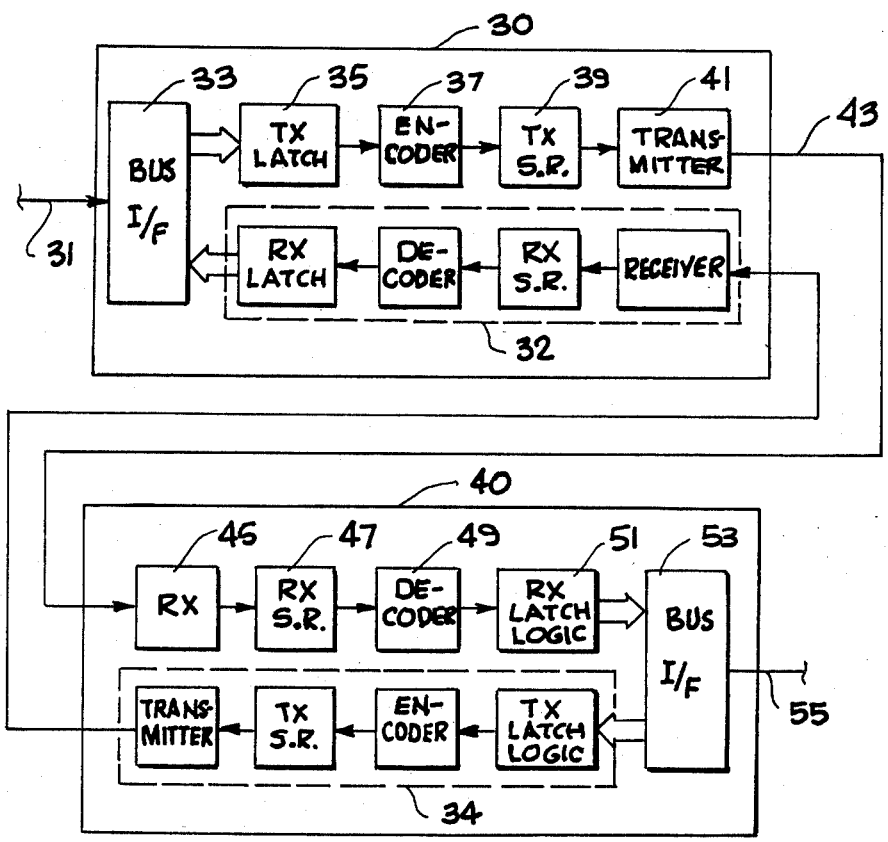
FIG. 2 is a simplified schematic plan for a pair of bus extenders in accord with the present invention.

The simplified block diagram of FIG. 2 indicates the organization of the databus extender of the present invention. Parallel data arrives on a databus, such as an IEEE-488 bus, indicated by arrow 31. Transceiver 30 contains both a transmit section and a receive section. It is identical in construction to a distant transceiver 40. The transmit section of one transceiver communicates with the receive section of the other transceiver and vice versa. One of the stations is usually termed the local station and the other station termed the remote station, but the stations are interchangeable in all respects. Typically, a bus such as parallel bus 31, is terminated with proper impedance matching networks and then the incoming bits are regenerated in a bus interface 33. The incoming data word is decomposed with transmit latch logic 35 into a data portion and a management portion. The data portion is organized into a data sub-frame in encoder 37 while the management portion is encoded into a management sub-frame in the same encoder. These sub-frames are sent to a transmit shift register 39 where serial organization is complete. A transmitter 41 functions as a serial line driver over the communications link 43.

Transceiver 40 has a data receiving section 45 which receives serial data from line 43 and transmits it to receive shift register 47. Sub-frames are then transmitted to decoder 49 where the sub-frames are stripped of temporary coding supplied by encoder 37 and then transmitted to receive latch 51. This latch assembles frames as originally sent on bus 31 for transfer to bus interface 53. Bus interface 53 regenerates the frame for transfer on parallel bus 55. Transceiver 40 also contains a transmitter section for communicating with receiver section of transceiver 30. The receive section 32 of transceiver 30 is identical to the previously described receive section of transceiver 40. Similarly, the transmit section 34 of transceiver 40 is identical to the previously described transmit section of transceiver 30.

Figure 3:
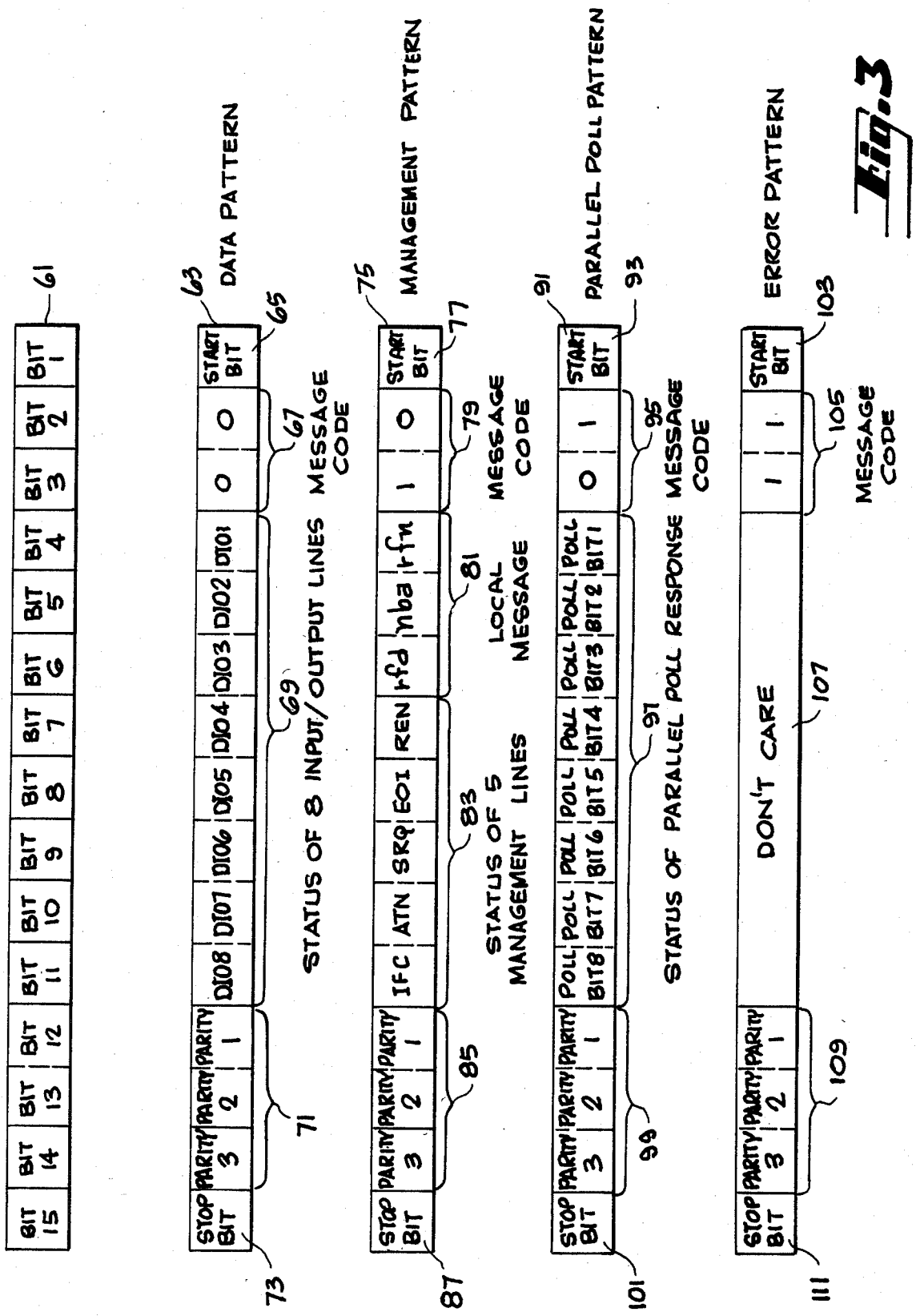
FIG. 3 is a plan view of information sub-frames in accord with the present invention.

FIG. 3 illustrates the organization of data bits in a sub-frame. Sub-frame 61 merely indicates that each sub-frame comprises 15 binary bits. A first type of sub-frame used in accord with the present invention is data pattern 63 comprising a start bit 65 in the first bit position, a message code occupying the next two bits 67, 68, data bits 69 occupying the next 8 bit positions, 3 parity bits 71 and a stop bit 73. Message code 67 is a special tag which identifies the data pattern as one of four possible patterns. The message code is applied at one end, such as in a transmitter section and removed at another end in the receiver section.

Another sub-frame 75 is a management pattern. This sub-frame has a similar structure including a start bit 77, a message code 79, a local message 81 consisting of three binary bits. These bits are labeled "rfd," "nba" and "rfn." The purpose of these bits is to coordinate handshaking between the local and remote station. These bits are highly significant because they establish a new communications protocol. The bit labeled "rfd" means "ready for data"; the bit labeled "nba" means "new byte available"; the bit "rfn" means "ready for next byte." While the first two bits have been used in the prior art, the combination of these two with a new bit, "rfn" eliminates the need for four sub-frame shuttles per frame. With three local message bits, only two shuttles per frame are required. Examples using these bits are in the Table below. The next 5 bits 83 represent management data which was derived from the original bus data. The five bits include "REN" for remote enable, "EOI" for end or identify, "SRQ" for service request, "ATN" for attention and "IFC" for interface clear. These management bits carry the data shown on lines 21 in FIG. 1. The management bits are followed by three parity bits 85 followed by a stop bit 87.

A third type of sub-frame is a parallel poll pattern represented by sub-frame 91. This sub-frame includes a start bit 93, followed by a two-bit message code 95, in turn followed by 8 poll bits 97. The poll bits are usually requested and obtained by the bus controller from the instruments or other devices on the data bus. These bits are followed by the three parity bits 99 and a stop bit 101.

The fourth type of sub-frame is an error pattern sub-frame. Such a sub-frame consists of a start bit 103, followed by a two-bit message code 105, followed by 8 arbitrary bits 107, three parity bits 109 and a stop bit 111. The main function of the error pattern is to bear the message code 105 which automatically indicates that an error has occurred. Note that the two bits of the message code are sufficient to designate four different messages. The message codes are a tag which are applied to each sub-frame designating its function. The present invention creates a high-speed shuttle of sub-frames which convey management information, thereby establishing a handshaking protocol, then transmitting data in a data sub-frame and then assuring that the data has been received.

Figure 4A:
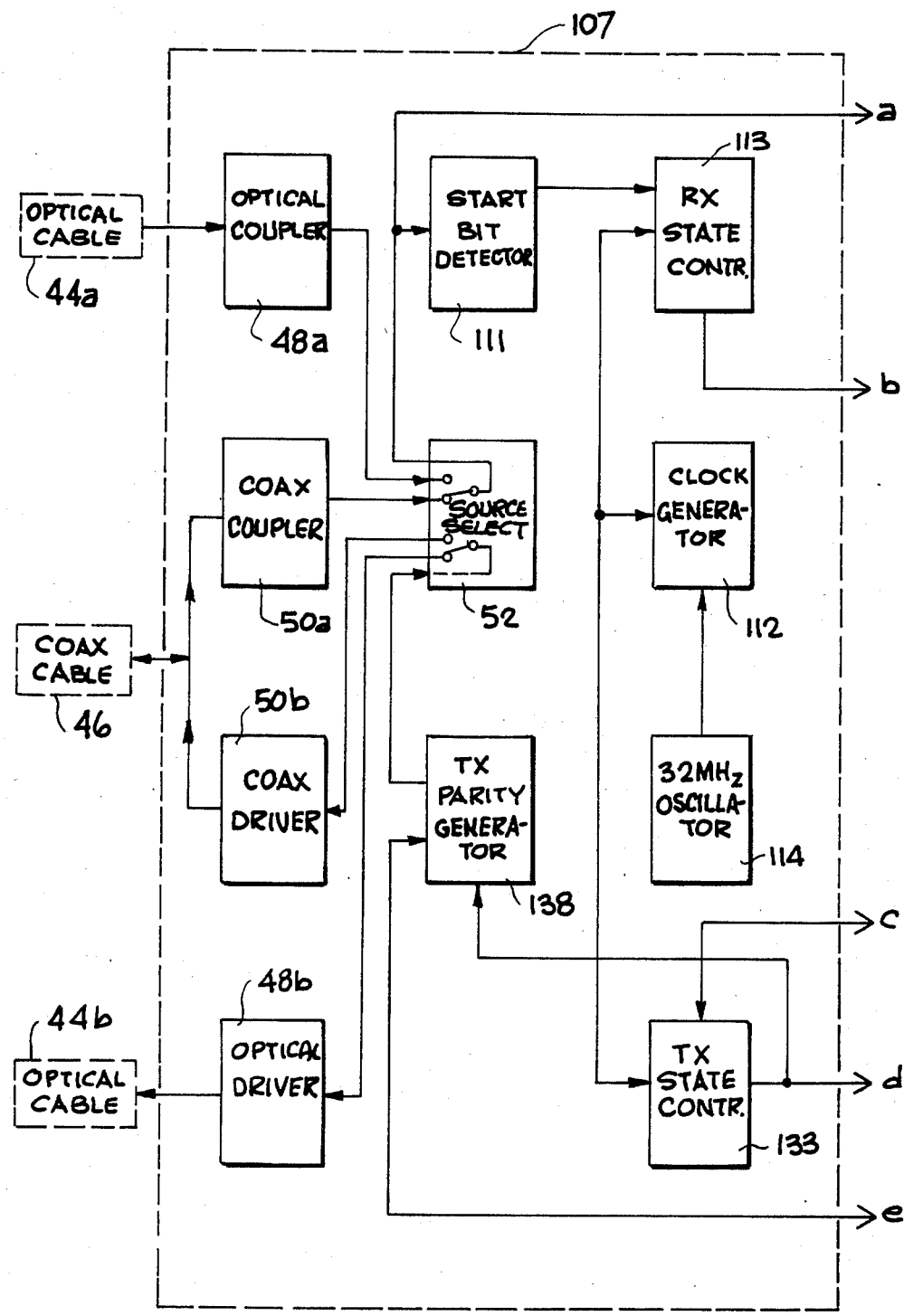
FIGS. 4a and 4b are a detailed plan view of a single bus extender in accord with the present invention.
Figure 4B:
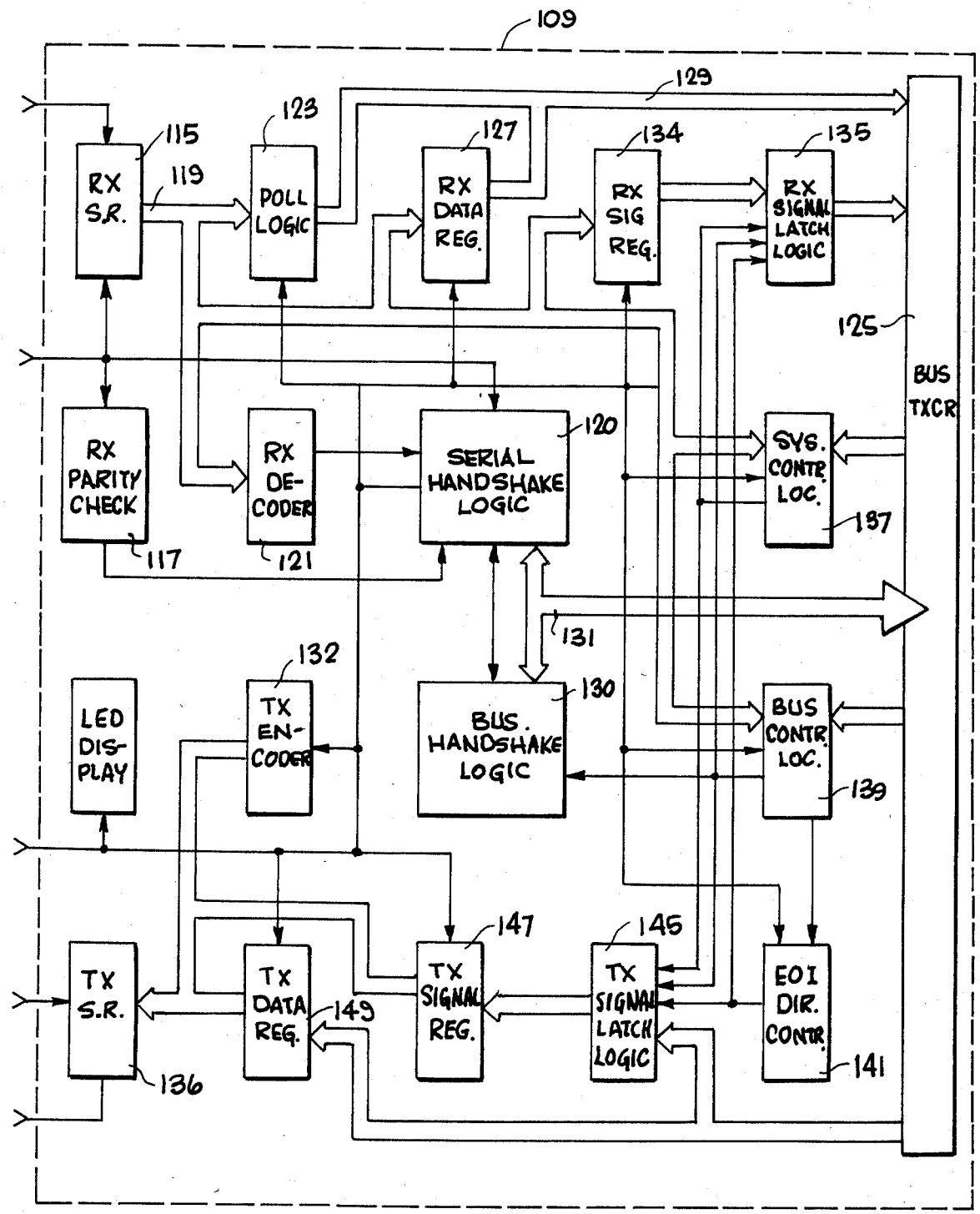

With reference to FIGS. 4a and 4b, a more detailed block diagram of transceiver 40 of FIG. 2 is shown. The transceiver includes an input/output section, or a serial section 107 in FIG. 4a and a parallel or bus section 109 in FIG. 4b. With reference to FIG. 4a, the serial section includes a serial link 44a and 44b which is shown to be a pair of optical cables each transmitting in a direction opposite to the other, or alternatively a bi-directional coaxial cable 46. The optical cables are connected to a respective optical coupler 48a and an optical driver 48b. In the case of a coaxial cable, the cable is terminated in one direction into coax coupler 50a and in the other direction to coax driver 50b. A switch 52 selects which of the paths is to be used. The respective couplers convert incoming signals from the serial link to electrical signals suitable for transmission on a printed circuit board. Once selected, incoming data is transmitted to a start bit detector 111. The start bit detector continuously looks for a start bit to synchronize receive state control 113. The receive state control clocks the receive shift register 115 as well as serial handshake logic 120 in FIG. 4b. The receive state control also clocks the parity check 117 to detect any transmission errors. Should the parity check fail, the input frame will be discarded and an error pattern sub-frame sent back to the distant transceiver to resend the message. With reference to FIG. 4b, the receive shift register 115 generates parallel data along bus 119. The receive decoder interprets the message code and any local message for serial handshake logic 120. If a poll pattern has been received in the input frame, serial handshake logic 120 will order poll logic 123 to store the parallel poll response and pass it to bus transceiver 125.

If the input frame is a data sub-frame, serial handshake logic 120 will command the receive data register 127 to accept data from receive shift register 115 and save the status of the 8 data bits and pass it to the bus transceiver along bus 129. The serial handshake logic 120 then commands bus handshake logic 130 to produce a handshake signal on bus 131 for the bus transceiver 125. If the incoming sub-frame is an error pattern sub-frame, serial handshake logic 120 will discard the input frame and inform the transmit state control 133 to send the prior pattern once again.

If the input pattern is a management pattern with local message rfn=1, serial handshake logic will not interfere with the NRFD signal on the bus. If rfn=0 after receiving a data sub-frame, the serial handshake logic will set the NRFD signal low true if the bus handshake logic 130 is in acceptor handshake and the bus controller location output DC=0. DC=0 means the bus extender is at the bus controller side.

If the input pattern is a management pattern with local message nba=1, the serial handshake logic will always order the receive signal register 134 to store the valid IFC status; and it will ignore the REN, ATN, SRQ and EOI status unless the bus handshake logic 130 is ready for a new byte source handshake. If the bus handshake logic 130 is ready for a new parallel data byte handshake, the serial handshake logic 120 will order the receive signal register 134 to store the valid status of all the five management lines, order the bus handshake logic 130 to prepare for a source handshake, and enable the "rfd" bit at the transmit encoder. Then, the serial handshake logic 120 will enable the transmit encoder 132 and transmit signal register 147 and order the transmit state control 133 to send a management pattern with rfd=1 in return.

If the input pattern is a management pattern with rfd=1, the serial handshake logic 120 will store the valid SRQ, EOI, ATN, IFC and REN status, enable the transmit data register 149 and order the transmit state control 133 to send a data pattern in return.

The receive signal latch logic 135 interfaces between the receive signal register 134 and bus transceiver 125 according to the information from the system controller location 137, bus controller location 139 and EOI direction control 141. The receive signal latch logic 135 only allows the valid management line status to flow from the receive signal register 134 to the bus transceiver 125 by breaking the invalid status communications.

The transmit signal latch logic 145 interfaces between the transmit signal register 147 and bus transceiver 125. Upon receiving the control information from the system controller location 137, bus controller location 139 and EOI direction control 141, it only allows the valid management line status to flow from the bus transceiver 125 to the transmit signal register 147.

The system controller location 137 determines which transceiver in a connected pair sent IFC or REN via the serial link. Only one of the devices on the IEEE 488 bus can be the system controller and eligible to send IFC and REN messages. At power-on, the system controller location 137 output is reset (SC=0) and the serial transmissions of REN and IFC are enabled. The transceiver receiving IFC or REN true from the serial link will set SC=1 and prohibit the serial transmissions for IFC and REN messages.

Bus controller location 139 determines which transceiver in a connected pair sent ATN true last. This is used for passing control from one controller to another and specifying the flow directions of ATN, SRQ and EOI messages. At power-on, the bus controller loation 139 output is reset, DC=0 and the serial transmission of ATN message is enabled. The transceiver receiving ATN true from the serial link will set DC=1 and prohibit the serial transmission for ATN message. An ATN true originating from a bus controller on the IEEE bus will reset that side's bus extender's bus controller location to DC=0 and enable the serial transmission of an ATN message. This enables the bus controller in charge to pass control to the other bus controller at the other end of the cable.

The EOI direction control 141 specifies the flow direction of EOI message according to the bus controller location 137 output, bus handshake logic 130 state and the level of ATN message.

The parallel poll logic 123 detects the parallel poll request and sends the parallel poll response. During a parallel poll, the bus controller activates ATN and EOI in the local station. In the remote station, the parallel poll logic detects the request and, after a timeout of 5 $\mu$S, informs the serial handshake logic to send back the parallel poll pattern. The local station, after the serial transmission delays, passes the parallel poll response to the bus controller.

The transmit state control 133 clocks the transmit shift register 136 to convert the parallel frame into a serial frame. Simultaneously, the transmit state control 133 clocks the transmit parity generator 138 to generate the parity bits.

Operation of the invention is exemplified by the following Table:

TABLE

Example 1

| REMOTE TALKER | REMOTE STATION | | (idle) | LOCAL STATION | | LOCAL BUS CONTROLLER |
|---|---|---|---|---|---|---|
| | NDAC=T,NRFD=F (Acceptor) | MANAGEMENT PATTERN (nba=0,rfd=0,rfn=1) | ⟷ | MANAGEMENT PATTERN (nba=0,rfd=0,rfn=1) | NDAC=T,NRFD=F (Acceptor) | |
| NDAC=T,NRFD=T | | | | | NDAC=T,NRFD=T | DAV=T |
| | DAV=F (source) | | ↓ | MANAGEMENT PATTERN (nba=1,rfd=0,rfn=x) | | |
| NDAC=T,NRFD=F | | MANAGEMENT PATTERN (nba=0,rfd=1,rfn=x) | ↑↑ | DATA PATTERN | | |
| NDAC=F,NRFD=T | DAV=T | | ↑ | | NDAC=F,NRFD=T | |
| NDAC=F,NRFD=T | DAV=F | MANAGEMENT PATTERN (nba=0,rfd=0,rfn=x) | | | NDAC=T,NRFD=T | |
| NDAC=T,NRFD=T | | | | | NDAC=T,NRFD=F (next parallel data byte) | DAV=F |
| | (next parallel data byte) | | | (next parallel data byte) | | |

Example 2

| REMOTE TALKER | REMOTE STATION | | (idle) | LOCAL STATION | | LOCAL BUS CONTROLLER |
|---|---|---|---|---|---|---|
| | NDAC=T,NRFD=F (Acceptor) | MANAGEMENT PATTERN (nba=0,rfd=0,rfn=1) | ⟷ | MANAGEMENT PATTERN (nba=0,rfd=0,rfn=1) | NDAC=T,NRFD=F (Acceptor) | |
| DAV=T | | | ↑ | | | |
| | NDAC=T,NRFD=T | MANAGEMENT PATTERN (nba=1,rfd=0,rfn=x) | ↓↑ | MANAGEMENT PATTERN (nba=0,rfd=1,rfn=x) | | |
| | | | | | DAV=F (source) | |
| DAV=F | NDAC=F,NRFD=T | DATA PATTERN | | | DAV=T | NDAC=T,NRFD=T |
| | NDAC=T,NRFD=T | | | | DAV=F | NDAC=F,NRFD=T |
| | | MANAGEMENT PATTERN (nba=0,rfd=0,rfn=1) | ↓ | MANAGEMENT PATTERN (nba=0,rfd=0,rfn=1) | | NDAC=T,NRFD=F |
| | NDAC=T,NRFD=F (next parallel data byte) | | | (next parallel data byte) | (next parallel data byte) | |

T = True; F = False; x = Don't care

In the Table, the first example is a local bus controller outputting commands to a remote talker and the second, the remote talker sending data to the bus controller. It is very important to note that while the local bus controller is outputting a command or data, or a local device is talking to another local device, the rfn of the local message in the management pattern sub-frame is ignored to improve the protocol speed. While the bus controller is outputting a command or data, no device can stop it. While a local device is talking to another device, the remote station responds as receiving command or data from the local bus controller. Only the bus controller can stop a talker or listener and the rfn of the local message is designed for the bus controller to stop a remote talker. For example, the transceiver station at the bus controller side receives a data pattern carrying a message terminator from a multi-message-stored talker on the remote bus; it may send the remote station a management pattern with rfn=0 to complete the serial protocol for that parallel data byte transfer and inform the remote talker to hold on the talking. Then the bus controller can output an UNTALK command to stop the remote talker.

As shown in the Table, while power turns on or the bus is idle, the bus handshake logic is reset to the acceptor handshake and the NDAC is set true and the NRFD is set false.

In Example 1, the bus controller initiates a parallel bus data byte transfer by setting the local bus DAV true. The local transceiver station responds by setting both the NDAC and the NRFD true and sending a management patern with nba=1. Upon receipt of nba=1, the remote transceiver station puts the bus handshake logic in the source handshake, sets the DAV false, and returns a management pattern with rfd=1 if the remote bus NRFD is false and NDAC is true. The local transceiver station will then send a data pattern and set the local NDAC false and NRFD true. As soon as the remote station receives the data pattern, it will send a management pattern with nba=0 and rfd=0 immediately. At the same time, the remote transceiver station passes the status of the data input/output lines to the remote bus and sets the DAV true if the NRFD is false and NDAC is true. Then, the remote transceiver station will set DAV false and reset the serial handshake logic and bus handshake logic for the next parallel data byte transfer if the remote bus NDAC turns false. Upon the receipt of the nba=0 and rfd=0, the local transceiver station will set NDAC and NRFD true if DAV turns false and then set NDAC true and NRFD false and wait for the next parallel data byte transfer.

The cycle repeats as the parallel bus data transfer continues. No step in this sequence can be initiated until the previous step is complete. Thus, parallel bus data transfer can proceed as fast as the involved parallel bus devices can respond, but not faster than the slowest device involved.

If a high speed device is talking on the parallel bus to a low speed device, or vice-versa, serial shuttles continue with the same patterns awaiting the next step of the serial handshaking protocol.

Example 2 shows a remote talker outputting parallel bus data to the bus controller on the local bus. The remote talker initiates the transfer by setting the DAV true. As shown in Example 1, four serial transmissions are required for each parallel data byte transfer; but there are two differences in the protocols between Example 1 and 2. The first difference is that the rfn bit of local message in Example 2 is not always a "don't care" bit. The second difference is in Example 2, when the transceiver station at the bus controller side receives the data pattern from the remote transceiver station, it may return a management pattern until the local bus NRFD turns false or after a wait of 5 μS, whichever occurs first.

In Example 1, the RFN bit of the local message in a management pattern is always ignored. This is because while the bus controller is outputting parallel bus data, the listener addressed will accept whatever parallel bus data the bus controller sends. However, in Example 2, the bus controller may need to interrupt the talker if a message terminator, e.g. CR, LF, or EOI on is received. The fourth serial transmission is the last transmission for a parallel bus data byte transfer. If the bus controller needs to interrupt the talker from talking, the transceiver station at bus controller side, after it receives a data sub-frame, can send the management pattern with rfn=0 to complete that data byte transfer and hold off the talker; then the bus controller can output an UNTALK command to stop the talker from talking. If the local station sends rfn=1 in the fourth serial transmission, the remote transceiver may return a management pattern with nba=1 to initiate next parallel data byte transfer if it has data to send.

It will be realized from the description herein that the local and remote stations are transparent to the parallel bus. Data arriving on a parallel bus is decomposed by a local transceiver station and reassembled at the remote transceiver station and retrainsmitted on a parallel bus. The same process occurs in reverse at the remote transceiver station back to the local transceiver station. The parallel bus has no indication that decomposition of a data frame and reassembly of the frame has occurred since the parallel bus is asynchronous.

We claim:

1. A method for serially transmitting a composite parallel frame between stations terminating local and remote parallel buses with a serial link therebetween comprising, receiving a parallel frame at a local station, decomposing the parallel frame into a data sub-frame and a management sub-frame, said management sub-frame including management bits from said parallel frame and a three bit local message for handshaking between stations, the three bits indicating the following states: ready for data, new byte available, and ready for next byte, tagging said sub-frames with message codes to enable said stations to distinguish data sub-frames from management sub-frames, serially transmitting a management sub-frame from the local to the remote station, said three bit local message of said management sub-frame indicating a new byte available, then receiving a serially transmitted management sub-frame from the remote station at the local station, said three bit local message of said management sub-frame indicating ready for data, then serially transmitting a data sub-frame from the local to the remote station and then receiving a serially transmitted management sub-frame from the remote station at the local station acknowledging the data sub-frame received.

2. The method of claim 1 further defined by transmitting an error sub-frame from one of said stations to another station, in response to an error condition, said error sub-frame tagged with a message code.

3. The method of claim 2 further defined by transmitting from one station the prior data sub-frame in response to receipt at said station of an error sub-frame.

4. The method of claim 1 further defined by reconstructing at the remote station parallel frames for transfer on a data bus, the parallel frame including information from said data and management sub-frames.

5. The method of claim 1 wherein each sub-frame comprises at least a start bit, message code bits, and data or management bits.

6. The method of claim 1 further defined by transmitting from one station to another station on command, a poll pattern.

* * * * *